United States Patent [19]
Chang

[11] Patent Number: 5,299,817
[45] Date of Patent: Apr. 5, 1994

[54] ADJUSTABLE MOBILE BASE

[76] Inventor: Seth Chang, No. 334, Tung-Jung Rd., Hsi-Jung Tsun, Ta-Li Hsiang, Taichung Hsien, Taiwan

[21] Appl. No.: 920,227

[22] Filed: Jun. 9, 1992

[51] Int. Cl.$^5$ ............................................. B62B 3/02
[52] U.S. Cl. ................................. 280/35; 280/79.11
[58] Field of Search ................ 280/79.11, 35, 638, 280/79.3

[56] References Cited

U.S. PATENT DOCUMENTS

| | | | |
|---|---|---|---|
| 211,828 | 2/1879 | Ash | 280/35 |
| 3,022,896 | 2/1962 | Dew | 280/638 |
| 3,137,512 | 6/1964 | Carpezzi | 280/79.11 |
| 3,163,438 | 12/1964 | Bliss | 280/638 |
| 3,331,613 | 7/1967 | Popelka | 280/35 |
| 3,945,449 | 3/1976 | Ostrow | 280/35 |
| 4,700,959 | 10/1987 | Lars | 280/79.11 |
| 5,121,808 | 6/1992 | Visentini | 280/638 |

FOREIGN PATENT DOCUMENTS 0701719  3/1966  Italy ................................. 280/79.11

*Primary Examiner*—David M. Mitchell
*Attorney, Agent, or Firm*—Lowe, Price, LeBlanc and Becker

[57] ABSTRACT

An adjustable mobile base includes a closed loop frame which has a plurality of angled members and a plurality of tubular connectors interconnecting the angled members. Each of the angled members is formed with a corner and has two tube sections. Each of the tube sections is formed with a plurality of spaced first engaging through holes which extends in the direction of a longitudinal axis of the tube section. Each of the angled members further has a triangular support plate secured on the corner. Each of the tubular connectors has two ends slidably inserted into a respective one of the tube sections of the angled members. Each of the tubular connectors is formed with a plurality of spaced second engaging through holes which are aligned with the first engaging through holes. A plurality of locking bolt units respectively extend through the aligned first and second through holes so as to join the tubular connectors and the angled members. Adjustments in the size of the mobile base can be achieved by varying the degree of insertion of the tube connectors in the tube sections of the angled members, thereby permitting the mobile base to fit machines of different sizes.

3 Claims, 5 Drawing Sheets

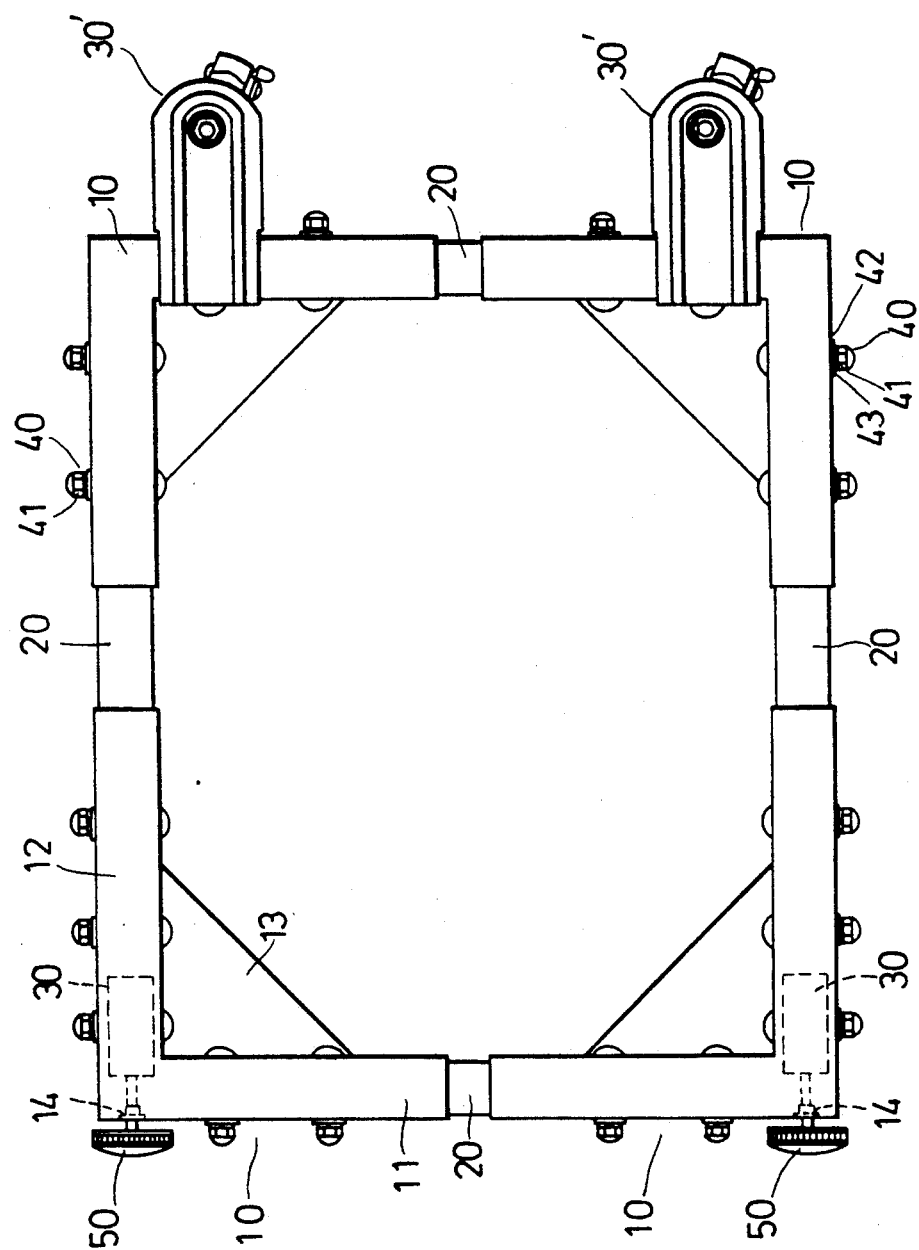

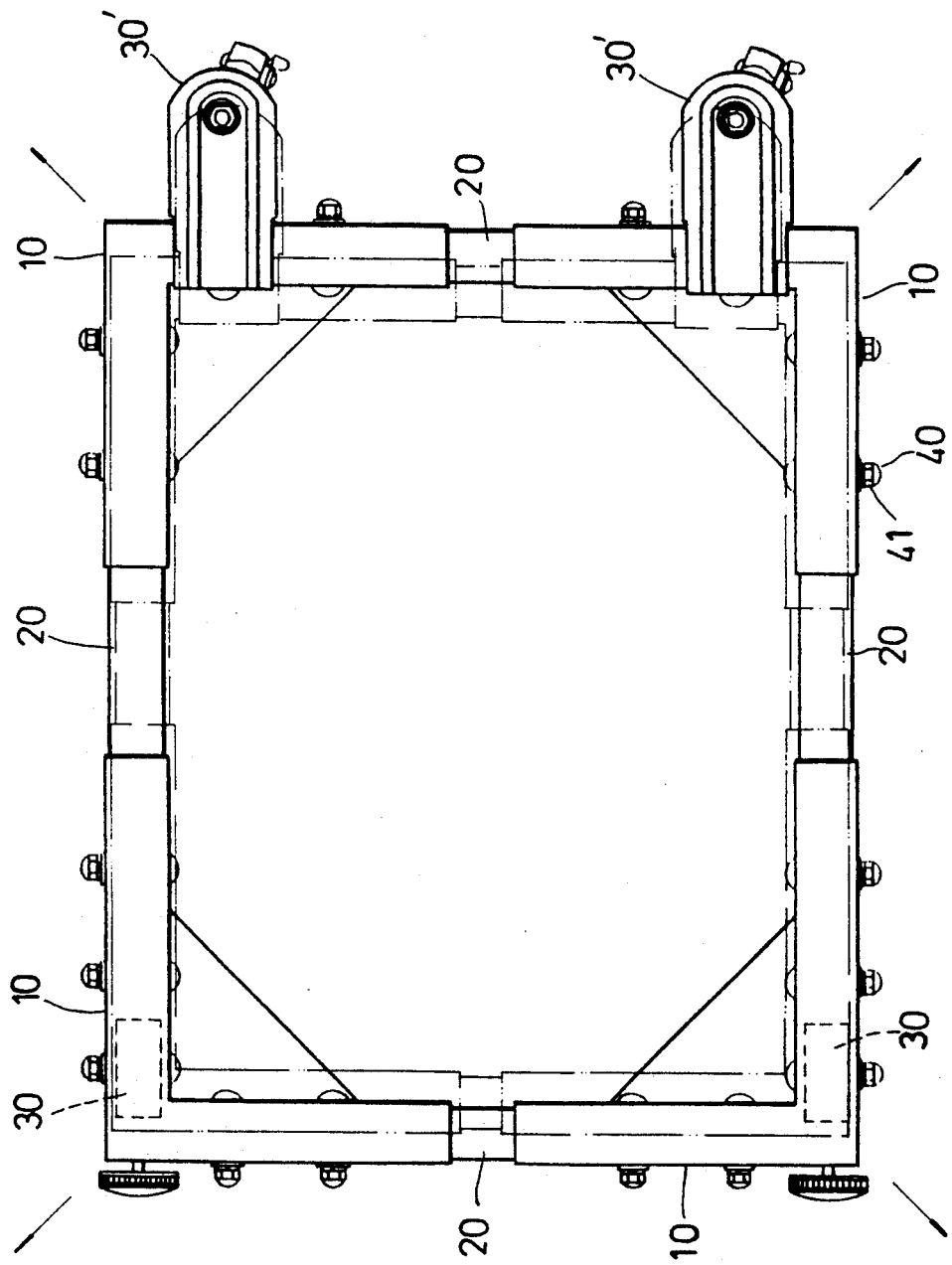

ADJUSTABLE MOBILE BASE

BACKGROUND OF THE INVENTION

1. Field of the Invention

The invention relates to a mobile base, more particularly to an adjustable mobile base which can be adjusted so as to fit machines of different sizes.

2. Description of the Related Art

It is common practice to provide a cushioning member on each of the legs of a table or chair so as to prevent direct contact between the legs and the ground, which contact may cause wearing of the legs. Some household appliances, such as refrigerators, are provided on top of a support so as to prevent direct contact between the base of the refrigerator and the ground, which contact may facilitate corrosion of the refrigerator housing. Other household appliances, such as stoves, are provided on top of a heat insulator so as to prevent the heat generated from damaging a table.

It has thus been shown that most objects require a partition to prevent direct contact between the objects and the ground or table surface, therefore preventing damage to the objects or to the table surface. This is also true for machining equipments. Machineries are available in different shapes and sizes and are often fitted with a mobile base.

The disadvantages of conventional mobile bases are as follows:

1. The sizes of the conventional mobile bases are not adjustable. Each mobile base is built to fit a specific type of machine. Mobile bases of different sizes should therefore be manufactured so as to fit different machines.

2. The space occupied by conventional mobile bases is relatively large, making them inconvenient to store and transport.

SUMMARY OF THE INVENTION

Therefore, the main objective of the present invention is to provide an adjustable mobile base which can be adjusted so as to fit machines of different sizes.

Another objective of the present invention is to provide an adjustable mobile base which can be easily assembled and disassembled and which can also be stored and transported conveniently.

Accordingly, the preferred embodiment of an adjustable mobile base for a machine includes a closed loop frame which has a plurality of angled members and a plurality of tubular connectors interconnecting the angled members. Each of the angled members is formed with a corner and has two tube sections. Each of the tube sections has a pair of opposing side walls formed with a plurality of spaced first engaging through holes which extends in the direction of a longitudinal axis of the tube section. Each of the angled members further has a triangular support plate secured on the corner for supporting the machine thereon. Each of the tubular connectors has two ends slidably inserted into a respective one of the tube sections of the angled members. Each of the tubular connectors further has a pair of opposing side walls formed with a plurality of spaced second engaging through holes which are aligned with the first engaging through holes. A plurality of locking bolt units respectively extend through the aligned first and second through holes so as to join the tubular connectors and the angled members. Adjustment of the size of the mobile base is achieved by varying the degree of insertion of the tube connectors in the tube sections of the angled members, thereby permitting the mobile base of the present invention to fit machines of different sizes.

BRIEF DESCRIPTION OF THE DRAWINGS

Other features and advantages of the present invention will become apparent in the following detailed description of the preferred embodiment, with reference to the accompanying drawings, of which:

FIG. 1 is a top view of the preferred embodiment of an adjustable mobile base according to the present invention;

FIG. 5 illustrates how adjustments in the size of the preferred embodiment is conducted.

DETAILED DESCRIPTION OF THE PREFERRED EMBODIMENT

Referring to FIG. 1, the preferred embodiment of an adjustable mobile base according to the present invention is shown to comprise a plurality of angled members (10), a plurality of tubular connectors (20), a plurality of caster units (30, 30') and a plurality of locking bolts (40).

Figure 2A:
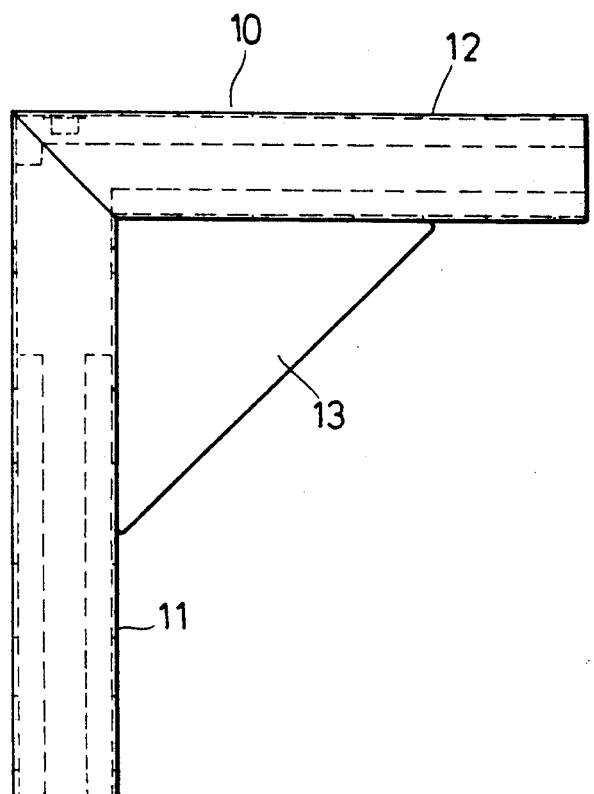
FIG. 2A is a top view of an angled member used in the preferred embodiment.
Figure 2C:
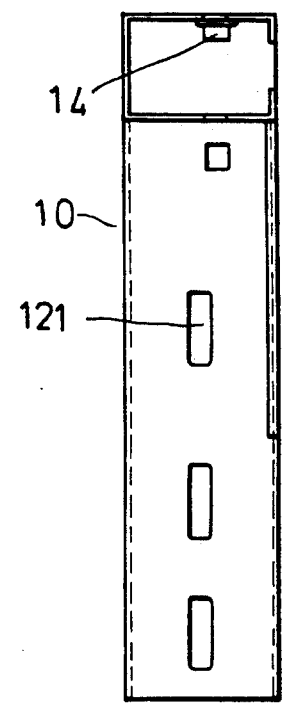
FIG. 2C is a front view of the angled member shown in FIG. 2A.
Figure 2B:
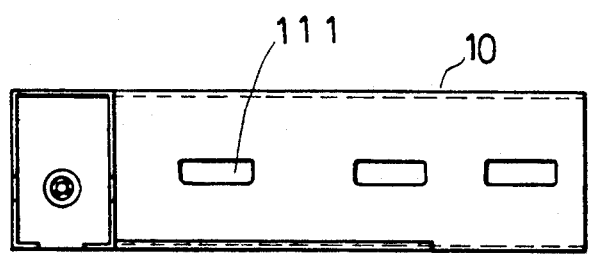
FIG. 2B is a side view of the angled member shown in FIG. 2A.

The preferred embodiment is shown to have four angled members (10). Referring to FIGS. 2A, 2B and 2C, each of the angled members (10) has two interconnected tube sections (11, 12) which cooperatively form a 90° corner. The angled member (10) is fabricated from a steel channel, which is a U-shaped metal strip that has two ends which are bent inwardly towards one another.

The tube sections (11, 12) have a pair of opposing side walls which are formed with a plurality of spaced engaging through holes (111, 121) that extends in the direction of a longitudinal axis of the tube sections (11, 12). In the preferred embodiment, the through holes (111, 121) are rectangular in shape and have longer edges which are parallel to the longitudinal axis of the respective tube section (11, 12) [The through holes (111, 121) may be formed in other shapes, such as oval or circular]. A triangular support plate (13) is secured to each of the tube sections (11, 12) at the respective 90° corner. Referring once more to FIG. 1, the angled members (10) which are disposed on the left side of the mobile base are each formed with a nut (14) that is disposed adjacent to the corner of the angled members (10).

The preferred embodiment is shown in FIG. 1 to have four tubular connectors (20). Each end of the tubular connectors (20) is slidably inserted into one of the tube sections (11, 12) of the angled members (10).

The angled members (10) and the tubular connectors (20) cooperatively form a closed loop frame which is rectangular in shape.

Figure 3C:
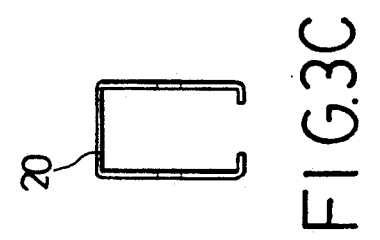
FIG. 3C is a side view of the tubular connector shown in FIG. 3A.
Figure 3A:
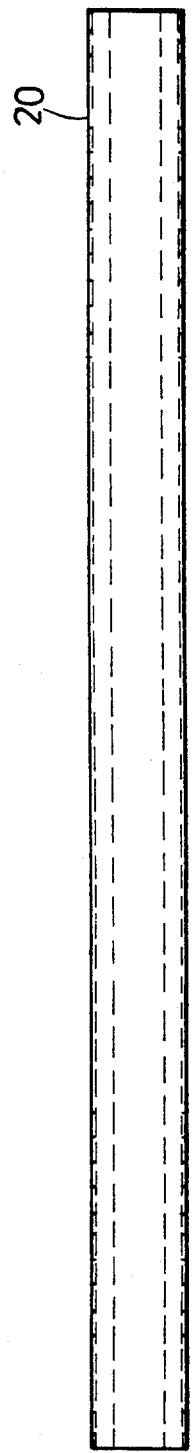
FIG. 3A is a top view of a tubular connector used in the preferred embodiment.
Figure 3B:
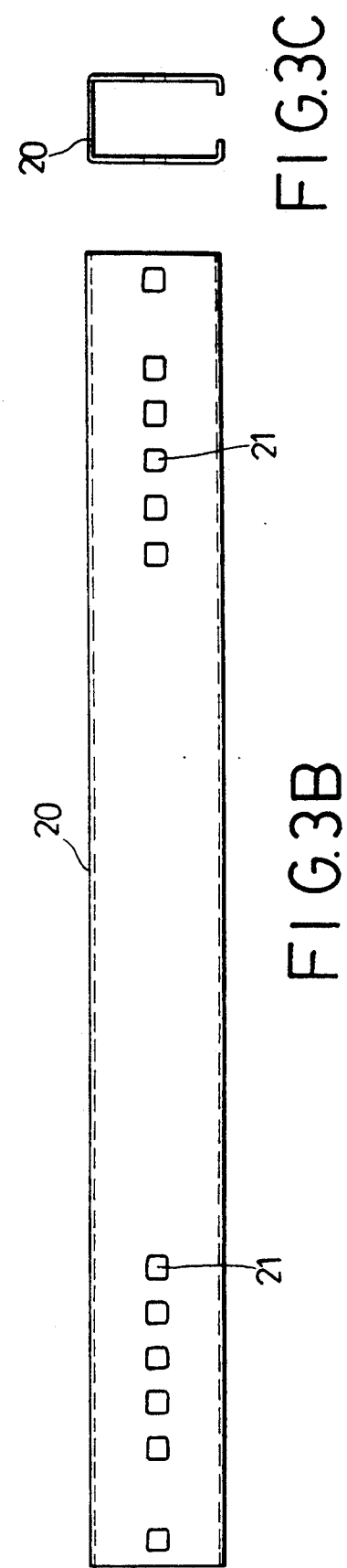
FIG. 3B is a front view of the tubular connector shown in FIG. 3A.

Referring to FIGS. 3A and 3B, the tubular connectors (20) have side walls which have end portions that are respectively formed with a plurality of spaced engaging through holes (21) which extend in the direction of the longitudinal axis of the tubular connectors (20). In the preferred embodiment, the through holes (21) are square in shape and are to be aligned with the through holes (111, 121) of the tube sections (11, 12) [The through holes (21) may be also formed in other shapes, such as oval or circular]. The tubular connectors (20) are similarly fabricated from a strip of steel channel. The cross-section of the tubular connector (20) is shown in FIG. 3C.

Referring again to FIG. 1, each of the angled members (10) has a caster unit (30, 30') provided thereon. Each of the nuts (14) of the angled members (10) which are disposed on the left side of the mobile base receives the shaft portion of a rotary control knob (50). The rotary control knobs (50) are used to lock the caster units (30) selectively so as to arrest undesired sliding movement of the mobile base.

Figure 4A:
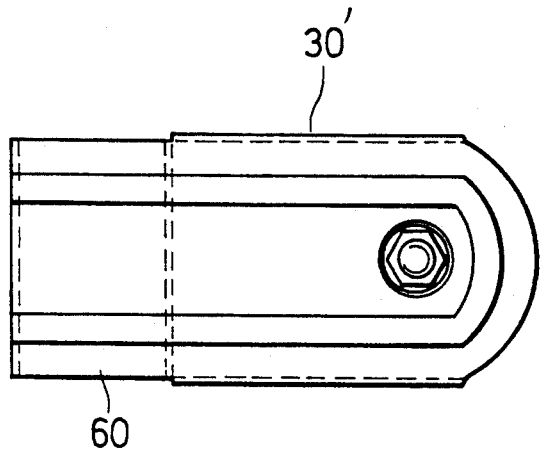
FIG. 4A is a top view of a caster unit used in the preferred embodiment.
Figure 4B:
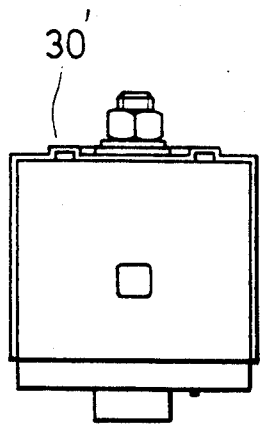
FIG. 4B is a front view of the caster unit shown in FIG. 4A.
Figure 4C:
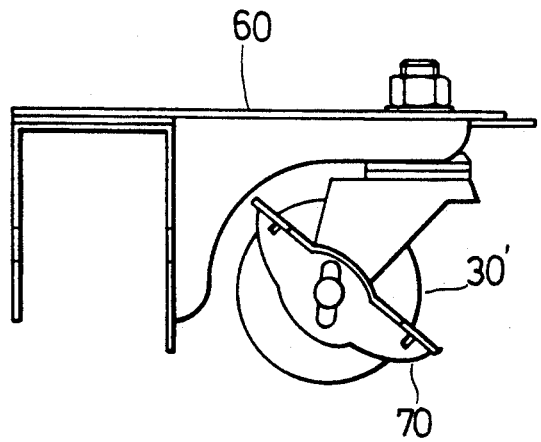
FIG. 4C is a side view of the caster unit shown in FIG. 4A.

Referring to FIG. 1 and to FIGS. 4A to 4C, the caster units (30') are disposed on the right side of the mobile base and are each provided with a mounting member (60). The mounting member (60) is secured to a corresponding one of the angled members (10) by conventional methods, such as by means of nuts and bolts. Each of the caster units (30') is further provided with a locking member (70) which is operated so as to prevent undesired movement of the caster unit (30') when the mobile base has been shifted to the desired position.

The square-neck locking bolts (40) extend through the aligned through holes (111, 121, 21) of the angled members (10) and the tubular connectors (20). A hexagonal nut (41) is provided on each end of the locking bolts (40) so as to secure the tubular connectors (20) to the angled members (10). Washers, such as a flat washer (42) and a lock washer (43), may be provided on the locking bolts (40) before attaching the nuts (41) to the same, thereby insuring tight engagement between the angled members (10) and the tubular connectors (20).

The following is a brief description of how the preferred embodiment is assembled: Each end of the tube connectors (20) is slidably inserted into one of the tube sections (11, 12) of the angled members (10). The through holes (21) of the tube connectors (20) are then aligned with the through holes (111, 121) of the corresponding tube section (11, 12). The edges of the through holes (21) are preferably shorter than the longer edges of the through holes (111, 121) so as to facilitate alignment of the through holes (111, 121, 21). The locking bolts (40) are then inserted into the aligned through holes (111, 121, 21) of the tube sections (11, 12) and the tubular connector (21). Flat washers (42) and lock Washers (43) are provided on the distal end of the locking bolts (40) before attaching the nuts (41) on the locking bolts (40) The angled members (10) and the tubular connectors (20) are in firm engagement at this stage. A caster unit (30, 30') is then secured to each of the angled members (10) [Note that the assembly of the caster units (30, 30') onto the angled members (10) may also be done before the tubular connectors (20) are secured onto the angled members (10)]. The rotary control knobs (50) are then attached to the angled members (10) at the nuts (14). The adjustable mobile base of the present invention is now ready for use, as shown in FIG. 1.

FIG. 5 illustrates how adjustments in the size of the mobile base of the present invention is conducted. When the present size of the mobile base of the present invention does not fit the size of a machine, the nuts (41) are loosened so as to remove the locking bolts (40) from the angled members (10) and the tubular connectors (20). The angled members (10) are then pulled outwardly (if the machine is bigger) or pushed inwardly (if the machine is smaller), until the size of the mobile base corresponds with the size of the machine base. The locking bolts (40) are again inserted into the through holes (111, 121, 21) of the angled members (10) and the tubular connectors (20), and the flat washers (42), the lock washers (43) and the nuts (41) are again attached to the distal end of the locking bolts (40) so as to lock the angled members (10) and the tubular connectors (20) in their new positions.

The advantages and characterizing features of the adjustable mobile base of the present invention are as follows:

1. The size of the mobile base can be adjusted easily so as to fit machines of different sizes. There is thus no need to manufacture or purchase mobile bases of different sizes. Furthermore, the mobile base is simple and easy to construct, thereby reducing the production costs thereof and increasing the production efficiency of the same.

2. The adjustable mobile base of the present invention is easy to assemble and disassemble and can be conveniently stored and transported since the size of the same can be reduced.

3. The adjustable mobile base is provided with caster units so as to facilitate movement of the machine from one place to another. The caster units are also provided with arresting attachments so as to prevent undesired sliding of the adjustable mobile base.

4. The adjustable mobile base of the present invention should not be limited for use with machines. The adjustable mobile base can be used to support, move and carry other objects as well.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. In an adjustable mobile base including a closed loop frame having a plurality of angled members and a plurality of tubular connectors interconnecting said angled members, the improvement comprising:

each of said angled members having two tube sections connected together to define a corner of said frame, each of said tube sections being formed with a plurality of spaced first engaging through holes which extends along a longitudinal axis of said tube section, each of said angled members further having a support plate secured to said tube sections at said corner;

each of said tubular connectors having two ends slidably and respectively relatively interfitting with a respective one of said tube sections of said angled members, each of said tubular connectors being formed with a plurality of spaced second engaging through holed at least one of which is aligned with at least one of said first engaging through holes; and wherein said mobile base further includes a plurality of locking bolt units respectively extending through said first and second aligned through holes so as to join said tubular connectors and said angled members, wherein said first through holes are rectangular in shape and have longer edges which are parallel to the longitudinal axis of the respective said tube section, and said second through holes are square in shape and have edges shorter than said longer edges of said first through holes.

2. The adjustable mobile base as claimed in claim 1, further comprising a caster unit provided on each of said angled members, said caster unit including means for arresting movement of said caster unit to prevent undesired movement of said mobile base.

3. In an adjustable mobile base including a closed loop frame having a plurality of angled members and a plurality of tubular connectors interconncting said angled members, the improvement comprising:

each of said angled members having two tube sections connected together to define a corner of said frame, each of said tube sections being formed with a plurality of spaced first engaging through holes which extends along a longitudinal axis of said tube section, each of said angled members further having a support plate secured to said tube sections at said corner;

each of said tubular connectors having two ends respectively slidably inserted into a respective one of said tube sections of said angled members, each of said tubular connectors being formed with a plurality of spaced second engaging through holes which are aligned with said first engaging through holes; and fastening members engagable with said aligned first and second through holes to connect said tubular connectors to said angled members;

wherein said first through holes are substantially rectangular in shape and have longer edges which are parallel to the longitudinal axis of the respective said tube section, and wherein said second through holes are substantially square in shape and have edges shorter than said longer edges of said first through holes, whereby said first and second through holes permit the said tube sections to clampingly engage side surfaces of a machine being supported in said frame when said fastening members tighten the tubular connectors to said angled members through said first and second aligned through holes.

* * * * *